Feb. 25, 1936.　　　A. W. HERRINGTON　　　2,032,318
TRANSMISSION GEARING

Filed Feb. 25, 1935　　　3 Sheets-Sheet 1

INVENTOR
*Arthur W. Herrington,*
BY *Hood + Hahn.*
ATTORNEYS

Feb. 25, 1936.　　　A. W. HERRINGTON　　　2,032,318
TRANSMISSION GEARING
Filed Feb. 25, 1935　　　3 Sheets-Sheet 2
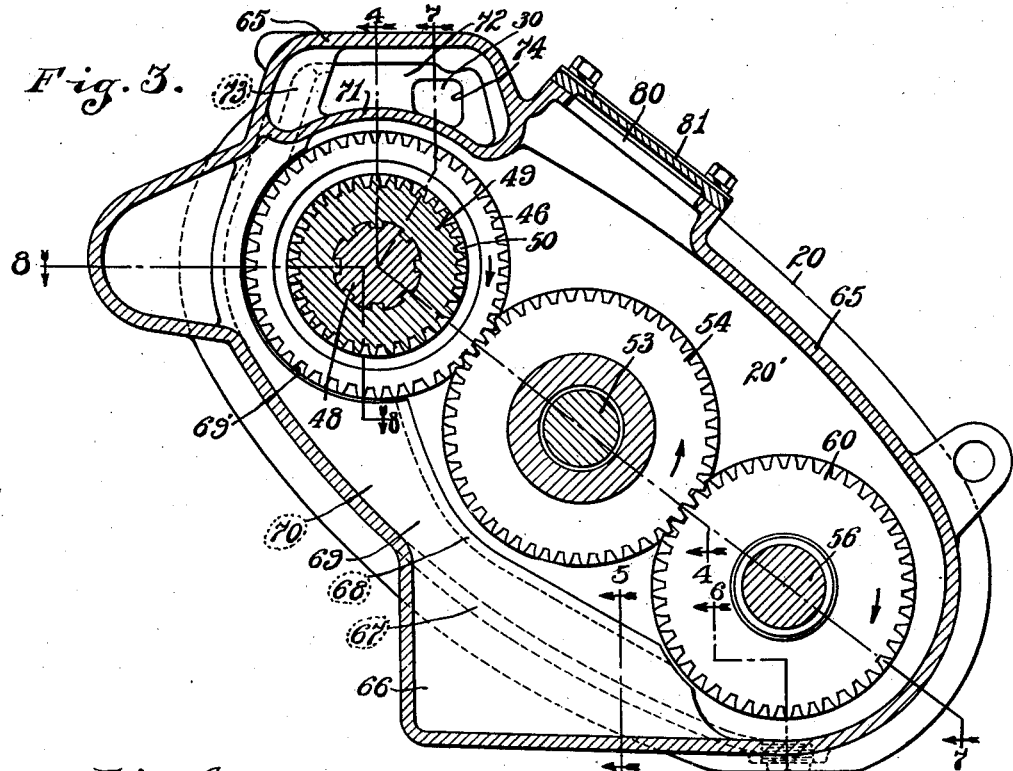
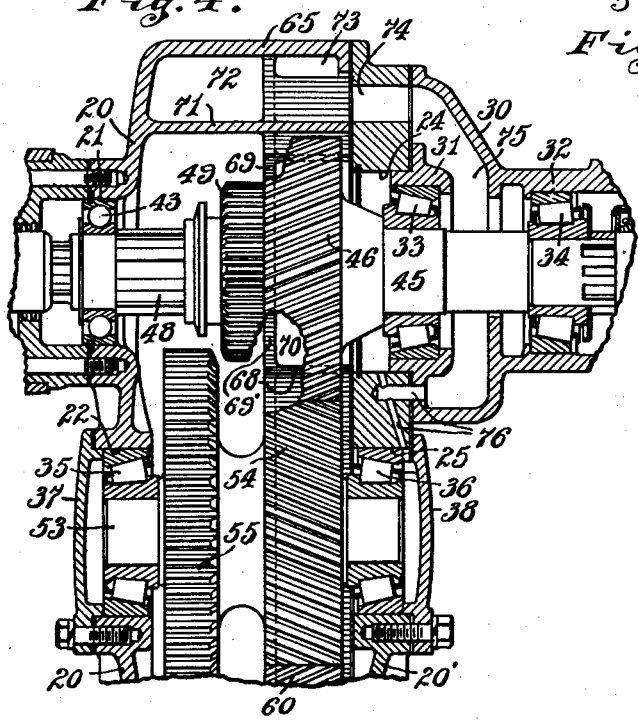
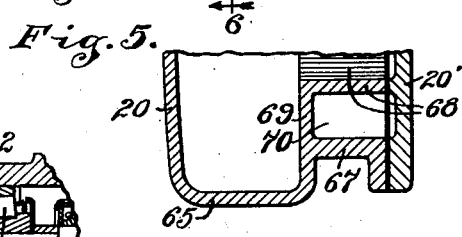
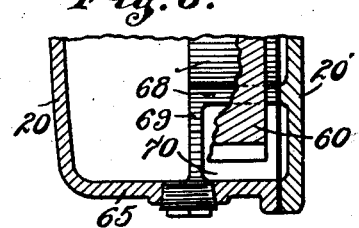
INVENTOR
*Arthur W. Herrington,*
BY
*Hood + Hahn.*
ATTORNEYS

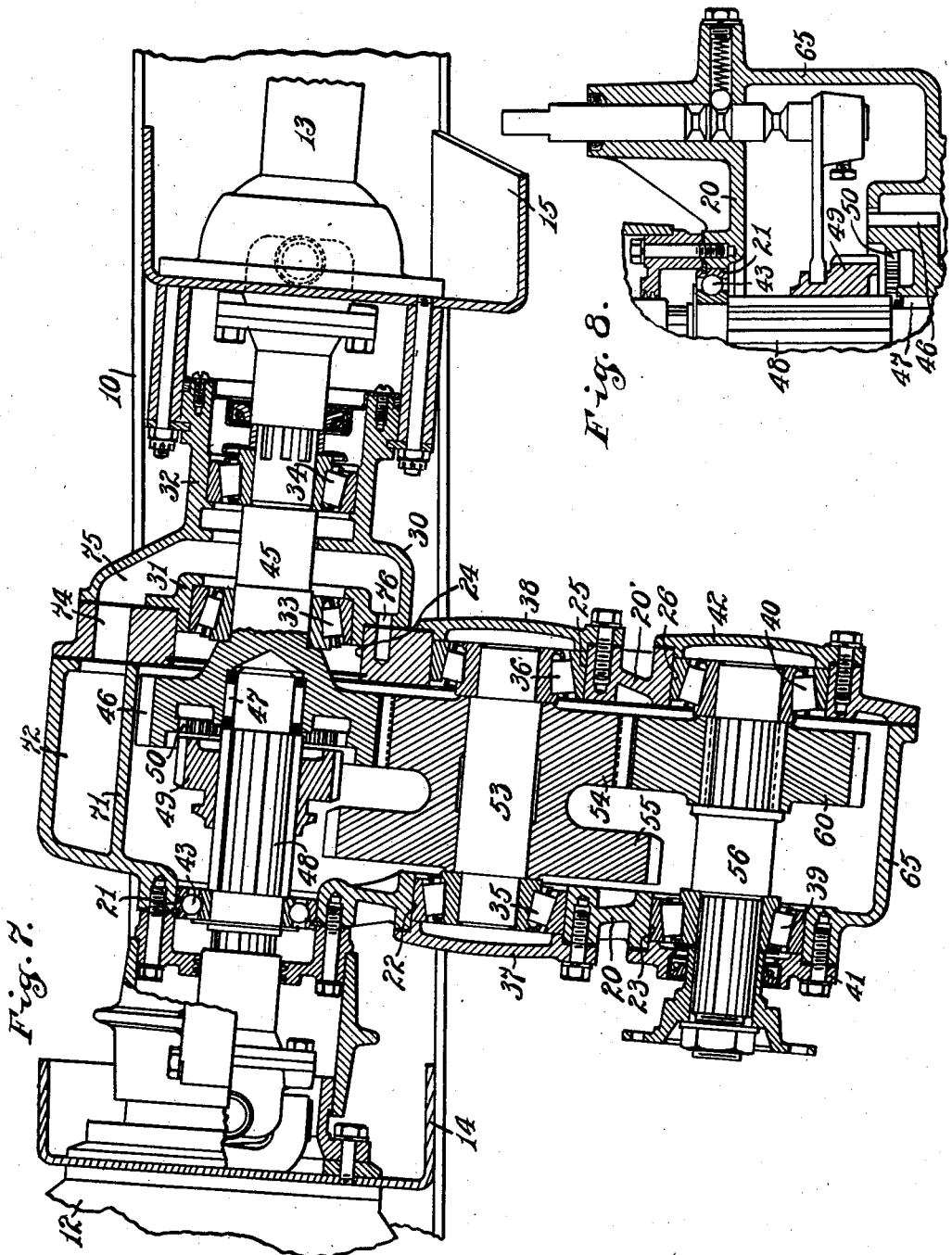

Patented Feb. 25, 1936

2,032,318

UNITED STATES PATENT OFFICE 2,032,318

TRANSMISSION GEARING

Arthur W. Herrington, Indianapolis, Ind., assignor to Marmon-Herrington Company, Inc., Indianapolis, Ind., a corporation of Indiana Application February 25, 1935, Serial No. 7,978

1 Claim. (Cl. 184—11)

The object of my present invention is to provide an improved power takeoff for use in automobiles for transmitting power from the motor to the front traction wheels.

The accompanying drawings illustrate my invention.

Figure 1:
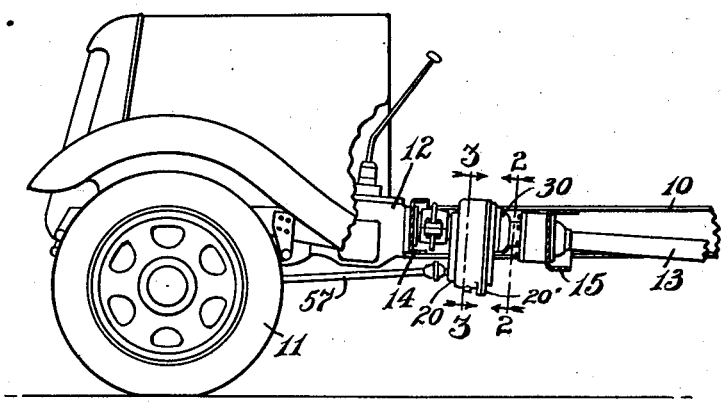
Figure 2:
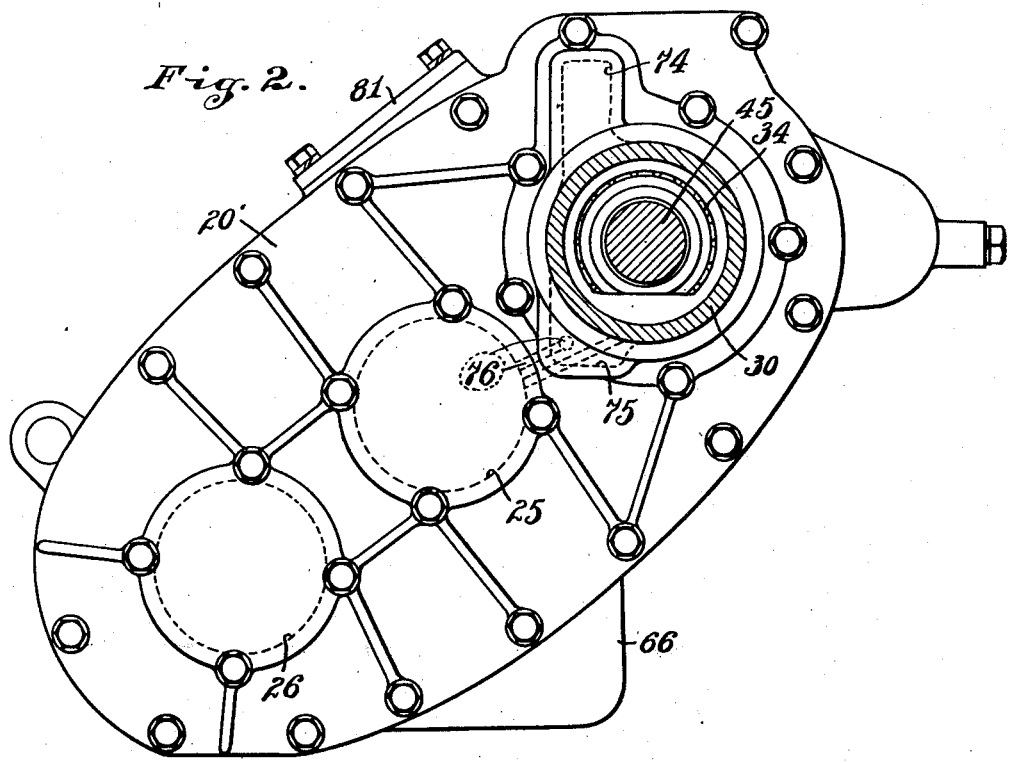

Fig. 1 is a side elevation, in partial vertical section, of the front end of an automobile embodying my invention;

Fig. 2 a section, on an enlarged scale, on line 2—2 of Fig. 1;

Fig. 3 a section on the scale of Fig. 2 on line 3—3 of Fig. 1;

Fig. 4 a fragmentary section on line 4—4 of Fig. 3;

Fig. 5 a fragmentary section on line 5—5 of Fig. 3;

Fig. 6 a fragmentary section on line 6—6 of Fig. 3;

Fig. 7 a section on line 7—7 of Fig. 3; and

Fig. 8 a section on line 8—8 of Fig. 3.

In the drawings 10 indicates the chassis frame, 11 the front traction wheels, 12 the usual speed and direction-varying transmission gearing and 13 the usual torque tube leading to the rear wheels of an automobile, said torque tube housing the usual shaft for transmission of power to the rear wheels (not shown). 14, 15 indicate cross bars forming part of the chassis frame.

My present improvement relates to a speed-varying power takeoff through which power is supplied to the front traction wheels. This power takeoff comprises a main shell or casing 20 having parallel bearing-receiving openings 21, 22 and 23 perforating the wall which is opposite the open face of the casing. The open face of this casing is closed by a cover 20' which is likewise perforated by bearing-receiving openings 24, 25 and 26 which align with the perforations 21, 22 and 23. Opening 24 is covered by a supplemental casing member 30 provided with aligned bearing-receiving cups 31 and 32 in which are respectively mounted anti-friction bearings 33 and 34. Perforations 22 and 25 respectively carry anti-friction bearings 35 and 36 and are respectively covered by cover plates 37 and 38. Perforations 23 and 26 respectively carry anti-friction bearings 39 and 40 which are respectively retained in place by a ring 41 and supplemental cover 42.

Mounted in perforation 21 is an anti-friction bearing 43 which is axially aligned with bearing 33. Journaled in bearing 33 is a power delivery shaft 45 provided with gear 49 and adapted to be connected to the shaft which is mounted with- in the torque tube 13. Journaled in the bearing 43 and in a bearing 47 at the inner end of shaft 45 is a shaft 48 upon which is splined a gear 49, which may be thrown into clutching engagement by a series of clutch teeth 50 formed within gear 46.

Journaled in bearings 35 and 36 is a shaft 53 which carries a gear 54 in mesh with gear 46 and a gear 55 which may be meshed by gear 49 when said gear is withdrawn from the clutching teeth 50.

Journaled in the bearings 39 and 40 is a power takeoff shaft 56 which is adapted to be connected to the shaft 57 (Fig. 1) which leads to the front traction wheels. Shaft 56 carries a gear 60 which meshes with gear 54.

The power takeoff structure described above is pivotally supported about the axis of shafts 45 and 48, upon the chassis cross bars 14 and 15 in such position that the plane of the axes of its several shafts inclines downwardly and outwardly, as indicated in Fig. 3, and the lower end of this casing is anchored upon one side bar of the chassis frame by any suitable means (not shown). The peripheral wall 65 of casing 20 is contoured substantially as shown in Fig. 3, one portion, in the vertical plane of gear 55 and offset relative to the vertical plane of gears 46, 54 and 60 to form an adequate oil sump 66 and in another portion 67, in the plane of the gears 46, 54 and 60 substantially parallel with the plane of the axes of those gears but substantially spaced from the peripheries of the gears 54 and 60. Substantially paralleling the portion 67 in a line fairly close to the periphery of gear 54, with its respective ends closely adjacent the peripheries of gears 46 and 60, is a partition 68 which springs from a vertical partition 69 which lies parallel with the open face of casing 20 and is spaced therefrom a distance approximating the widths of gears 46, 54 and 60, thereby forming an oil channel 70 leading upwardly from the lower regions of the casing 20 adjacent the periphery of gear 60 to and beyond gear 46. The free end of this partition 68 mates with cover 20', as indicated in Figs. 5 and 6. Partition 69 is notched, as indicated at 69' (Fig. 3) to lie closely adjacent the periphery of gear 46 into the upper regions of casing 20 where it joins with the cross partition 71 spaced below the top portion of wall 65 to form an oil reservoir 72 into which oil is thrown by gear 46 through a passage 73.

Cover 20' is perforated at 74 to afford passage for oil from chamber 72 into the interior 75 of the supplemental shell 30 where it may pass 65 to the bearings 33 and 34. Leading from chamber 75 is a passage 76 which leads to bearing 36.

An inspection opening 80 formed through wall 65 is covered by a removable cover 81.

In use oil is maintained in sump 66 at a level above the lowest portion of the orbit of the teeth of gear 55 and the gears rotate in the directions indicated by the arrows in Fig. 3, so that a certain portion of oil from the sump is carried by gear 60 to gear 54 and thence to gear 46, while another portion is delivered by the teeth of gear 60 into the lower end of passage 70 and driven upwardly therethrough into engagement with the periphery of gear 46 which boosts it through passage 73 into chamber 72, thereby providing an adequate supply of oil for bearings 33, 34 and 36.

I claim as my invention:

A front-wheel driving train for automobiles comprising, a casing embodying an oil retaining sump, a multiplicity of gear-carrying shafts arranged in an inclined series, a train of successively meshing gears carried by said shafts with the lower portion of the lowest gear in said sump, an oil passage formed within said casing with its lower end in the plane of and tangentially to the periphery of the lowermost gear, in position to receive oil discharged tangentially therefrom and to deliver said oil to the periphery of the uppermost gear, a wall hugging the periphery of the uppermost gear with its upper end above said uppermost gear, said wall forming an upwardly directed continuation of said oil passage toward bearings within the casing.

ARTHUR W. HERRINGTON.